United States Patent [19]

Dufrenne

[11] 4,228,340
[45] Oct. 14, 1980

[54] VOLTAGE REGULATED CAPACITIVE DISCHARGE WELDING POWER SUPPLY

[75] Inventor: Gerald Dufrenne, La Verne, Calif.

[73] Assignee: Unitek Corporation, Monrovia, Calif.

[21] Appl. No.: 900,666

[22] Filed: Apr. 27, 1978

[51] Int. Cl.² ............................................. B23K 11/26
[52] U.S. Cl. ......................................... 219/113; 320/1
[58] Field of Search ............................. 219/113; 320/1

[56] References Cited

U.S. PATENT DOCUMENTS

| | | | |
|---|---|---|---|
| 3,141,124 | 7/1964 | Atherton | 320/1 |
| 3,436,514 | 4/1969 | Broomhall et al. | 219/113 |
| 3,641,306 | 2/1972 | Oakes | 219/113 |
| 3,644,699 | 2/1972 | Mescheryak et al. | 219/113 |
| 3,819,983 | 6/1974 | Bjork | 320/1 |
| 3,868,562 | 2/1975 | Marshall | 320/1 |

*Primary Examiner*—B. A. Reynolds
*Assistant Examiner*—Clifford C. Shaw
*Attorney, Agent, or Firm*—Christie, Parker & Hale

[57] ABSTRACT

A welding power supply that includes a combination of series and shunt regulating circuits controlled by a single controller, in the charging circuit for a welding energy storage capacitor.

The series circuit, which includes a series thyristor, regulates the supply of charging energy to the capacitor from a full wave rectified power source. The series circuit also phases forward to replenish charge lost by leakage by controlling the thyristor firing angle as a function of the difference between the capacitor charge and a pre-selected value.

The shunt regulating circuit utilizes a shunt thyristor coupled to the output of the power source to divert energy delivery away from the energy storage capacitor when a preselected charge level on the capacitor is reached. The shunt regulating circuit shorts out the unneeded balance of the charging cycle thereby eliminating capacitor voltage overshoot during the charging process.

14 Claims, 4 Drawing Figures

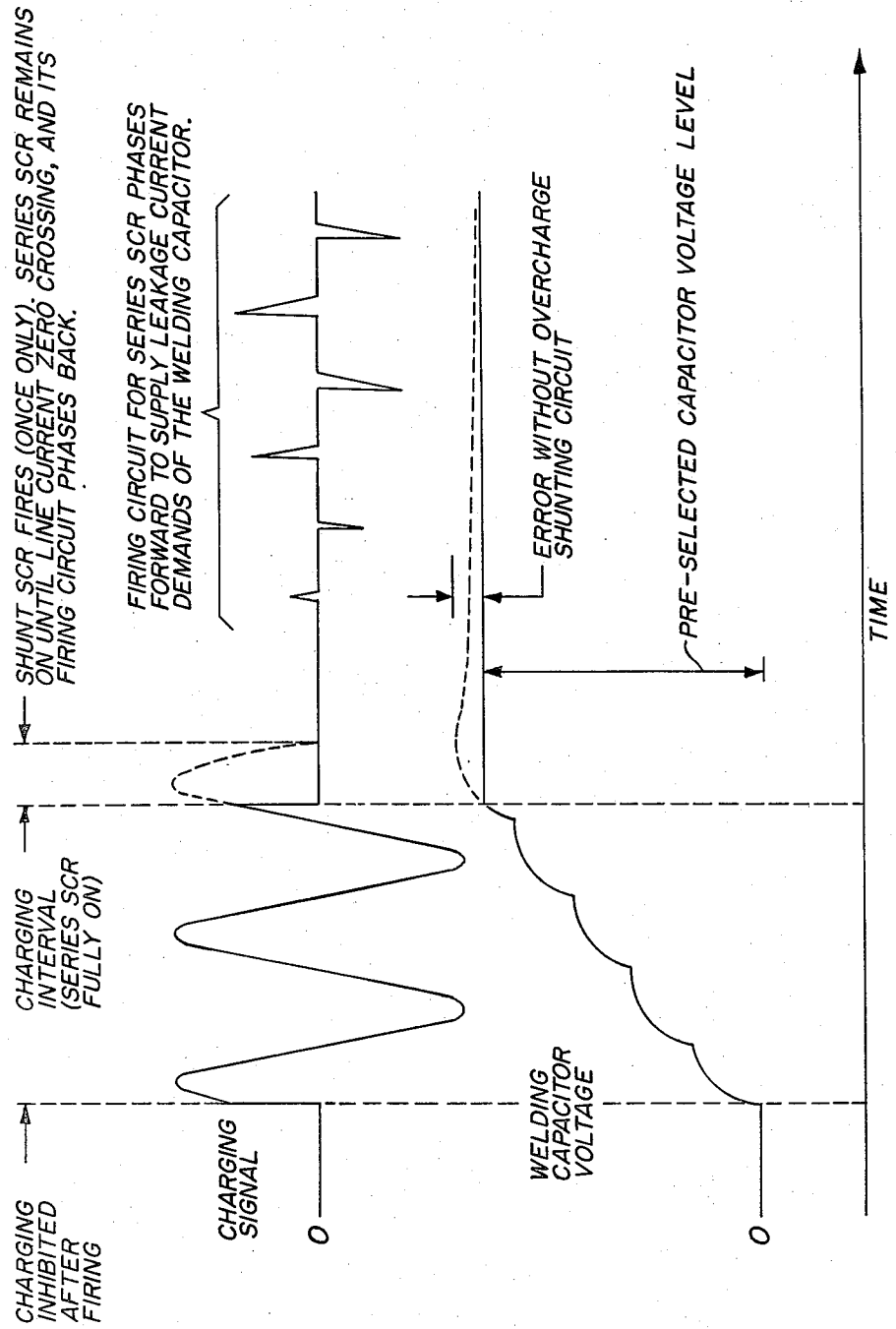

VOLTAGE REGULATED CAPACITIVE DISCHARGE WELDING POWER SUPPLY

BACKGROUND

1. Field of the Invention

This application relates to welding power supplies and more particularly to a supply that includes a combination of a series and shunt regulating circuits that result in strict regulation of the weld capacitor output voltage.

2. Description of the Prior Art

Welding power supplies are known in the prior art. One type of supply is described in U.S. Pat. No. 3,604,888. Operation of the described supply relies on a charge controller which gates a silicon controlled rectifier (SCR) that is connected in series with a full wave rectifier and a welding energy storage capacitor. Controllers of this design have an inherent problem in that they frequently charge the storage capacitor to a level beyond that desired. This consequence results from the fact that SCR's or triacs cannot be turned off coincident with the voltage of the storage capacitor reaching its pre-selected value. The series SCR continues to conduct and charge the weld capacitor until the rectifier line current goes to zero, causing a capacitor overcharge condition.

Another such supply is described in U.S. Pat. No. 3,436,514. Operation of the described power supply here again relies upon supply of energy from a full wave bridge rectifier to a storage capacitor through a charging circuit using a first series SCR. A second SCR in series with the storage capacitor's discharge path is gated by a timing pulse network such that the timing pulses prevent simultaneous conduction of both charging and discharging SCR's. However, the supply fails to provide storage capacitor voltage regulation or protection against overcharge occurring prior to the charging SCR turn off. In addition, neither the supply described in U.S. Pat. No. 3,604,888 nor the one described in U.S. Pat. No. 3,436,514, provide compensation for any charge leakage from the storage capacitors.

SUMMARY OF THE INVENTION

The present invention is directed towards an improved welding power supply for use with capacitive discharge resistance welder which achieves better regulation than heretofore possible. The welder comprises an energy storage capacitor, a circuit for supplying electrical charging energy to the capacitor and a shunting circuit for shunting energy delivery away from the capacitor when the capacitor is charged to a pre-selected level.

Regulation is achieved by shunting any remaining energy in the final charging pulse to ground after the capacitor has been charged to the pre-selected value.

The supply utilizes a series thyristor to initiate charging and a shunt thyristor to terminate capacitor charging. The unique interaction of the two circuits eliminates storage capacitor voltage overshoot and the possibility that excess energy is stored in the capacitor. This is especially important in precise and delicate welding operations where accurate energy delivery is essential.

Another feature of the welder is that the conduction angle of the series thyristor is increased in order to replenish capacitor charge lost by leakage, that is, the thyristor is phased forward as a function of the difference between the capacitor energy level and the pre-selected value.

Operation of the welder relies on thyristor control of a full wave rectified alternating current (A.C.) energy source. The amount of partial cycle of the A.C. source used in charging the storage capacitor is controlled by variation of the phase angle at which the series thyristor switching initiates charging current flow.

As discussed supra, the thyristor firing angle is controlled as a function of the difference between the storage capacitor energy level and a pre-selected value. This difference is generated by a high gain difference amplifier connected in a feedback loop between the energy storage capacitor and the series thyristor. The output of the amplifier is also connected to a shunt thyristor that is responsive to the amplified difference output such that the shunt thyristor is gated on when the capacitor reaches the pre-selected energy level. Thus, the shunt thyristor shunts to ground the remainder of the charging pulse thereby preventing storage overcharge and corresponding capacitor voltage overshoot.

At every zero crossing of the A.C. source, there is insufficient thyristor current to maintain it conductive and it turns off. If the pre-selected capacitor energy level has not been reached, a gating signal is applied to the series thyristor causing it to be conductive as the A.C. energy source passes beyond the zero crossing. When the pre-selected energy level has been reached, the shunt thyristor is gated on and remains on until the next zero crossing of the energy source thereby preventing any excess charging of the storage capacitor. Thus, the shunt thyristor is gated on to shunt to ground only the excess portion of one A.C. energy source half cycle, during a recharge cycle.

The series thyristor is rendered non-conductive as long as the storage capacitor remains at the pre-selected energy level and is rendered conductive upon completion of a welding operation or phased forward to replenish charge lost due to capacitor leakage.

BRIEF DESCRIPTION OF THE DRAWINGS

FIG. 4 is a graph illustrating the correlation between welding capacitor voltage and the unrectified charging signal.

DETAILED DESCRIPTION

Figure 1:
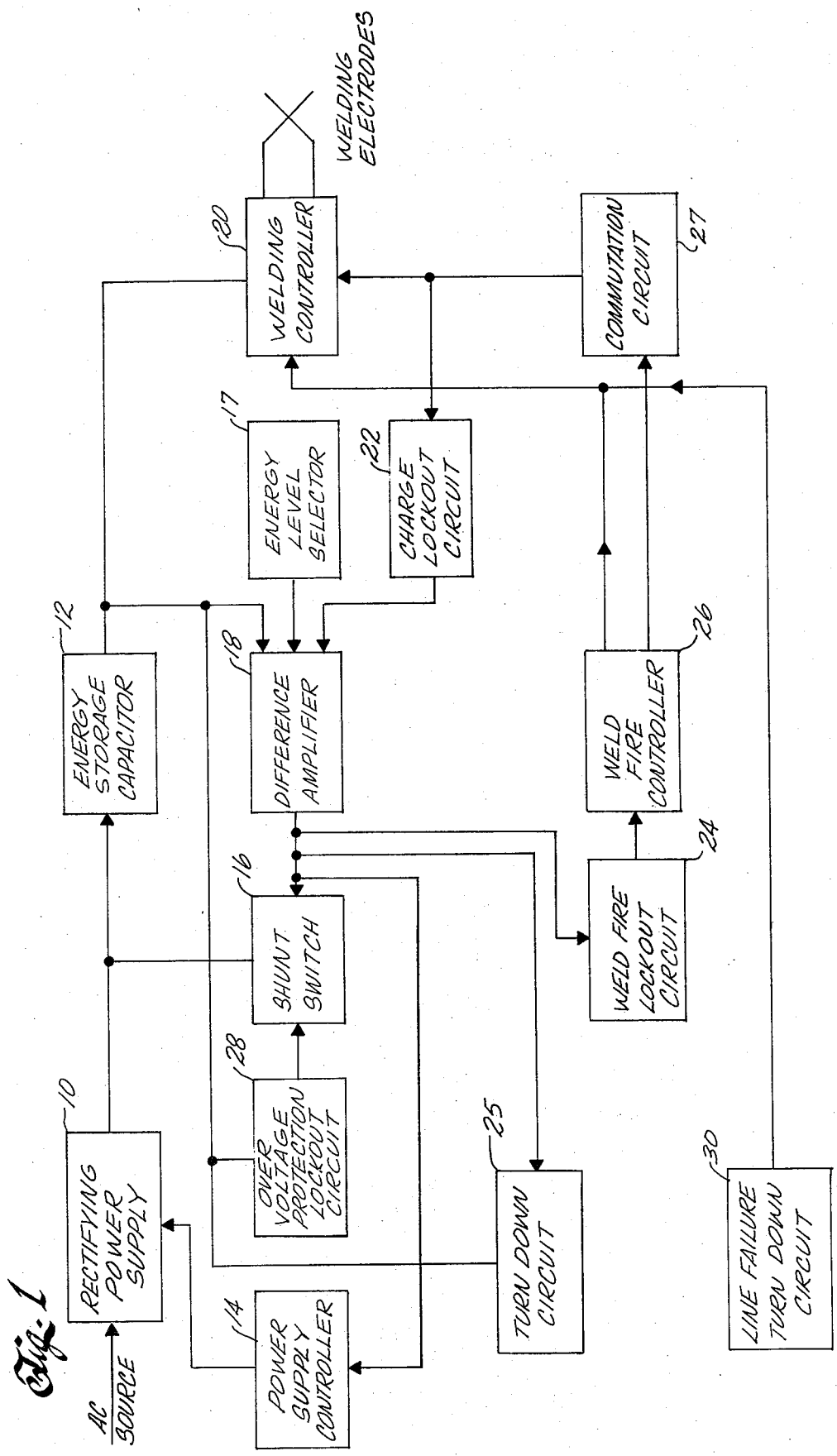
FIG. 1 is a block diagram of the welding power supply.

Referring to FIG. 1, there is shown a block diagram, of the highly regulated capacitive discharge resistance welder power supply of the herein described invention.

A conventional power supply 10, such as a transformer coupled to a full wave rectifier bridge, is connected through a series thyristor to standard alternating current (A.C.) line power source. The output of the power supply is connected through a suitable isolation circuit to an energy storage device 12, such as a capacitor bank. The capacitor bank serves to filter the full wave output of the power supply rectifier as well as providing means for establishing accurate energy levels for pre-selected welding requirements. The output of the energy storage device is coupled to a welding controller 20. In the presently preferred embodiment, controller 20 is a solid state contactor and pulse transformer to which is connected a pair of welding electrodes.

The level of energy stored in storage device 12 is controlled by means of the feedback loop consisting of a difference amplifier 18, a shunt switch 16, and a power supply controller 14. The difference amplifier 18 is a standard difference amplifier having an input connected to a reference voltage through an energy level selector 17, for alternately selecting different weld energy levels while the other end of the input difference amplifier is connected through suitable input resistors to the output of the energy storage device.

The power supply controller 14 inhibits and allows energy delivery to the energy storage device in accordance with the difference between the output voltage of the energy storage device and a pre-selected energy level. The pre-selected energy level is user provided by means of alternately connecting presettable resistor banks in energy level selector 17 to the input of the difference amplifier 18. The shunt switch 16, responsive to the output of the difference amplifier, serves to shunt to ground any excess energy in the final one-half cycle of energy delivered to the energy storage 12 from the power supply 10. The shunt switch is energized when the energy level in the energy storage 12 reaches the level selected by the energy level selector 17, thus preventing a capacitor overcharge condition and corresponding capacitor voltage overshoot.

An overvoltage protection lockout circuit 28 is connected between the output of the energy storage device and the shunt switch. The lockout circuit 28 protects the energy storage device from damage due to circuit malfunction or improper calibration. Upon detection of an energy level in excess of a protection value, normally set during welder assembly, a shunt switch energizing signal is issued by the lockout circuit 28.

Energizing of the shunt switch in such a manner causes high currents in the power supply 10 thereby activating a power interrupting circuit breaker included therein.

Weld fire controller 26 is, but not necessarily limited to, a manually operated switch device that energizes the welding controller 20 to deliver the energy stored in energy storage device 12 to a pair of welding electrodes. Energizing of the welding controller is done by means of a turn on control signal applied to a solid state contactor preferably a silicon controlled rectifier (SCR) that is connected in series circuit relationship with the pulse transformer.

A commutation circuit 27 connected between the weld fire controller 26 and the welding controller 20, serves to guarantee turn off of the SCR of welding controller 20.

In energy delivery systems, as in the welder herein described, the welding controller SCR must switch from the conducting state to the non-conducting state when energy delivery is complete. Turn off action of the SCR, which is called commutation, occurs when the SCR current is equal to zero. If the SCR fails to turn off, regulation of the welder is lost since the energized welding controller SCR provides an energy shunting path around the energy storage device thereby preventing the charging process.

In the preferred embodiment, commutating of the welding controller SCR is accomplished by means of application of a negative voltage pulse applied to the anode of the SCR directly after a welding action. The pulse diverts current from the SCR sufficient to cause it to return to its non-conductive state.

A charge lockout circuit 22 is connected between the commutation circuit 28 and the difference amplifier 18 and serves to inhibit charging of the energy storage device during energy delivery to the welding electrodes. Thus, precise amounts of pre-selected energy levels are delivered to the welding electrodes since no energy from power supply 10 is supplied to the energy storage means until the welding action is complete.

A turndown circuit 25 is connected between the output of the difference amplifier and the energy storage device output. The turndown circuit serves to discharge the storage device energy which is in excess of the pre-selected level when the selected energy level is lower than the level selected in a previous weld operation.

A weld fire lockout circuit 24 is connected between the difference amplifier output and the weld fire controller. The lockout circuit 24 serves to prevent poor welds by inhibiting the weld fire controller 26 unless the energy storage device is charged within 1 percent of the pre-selected energy level.

Figure 2:
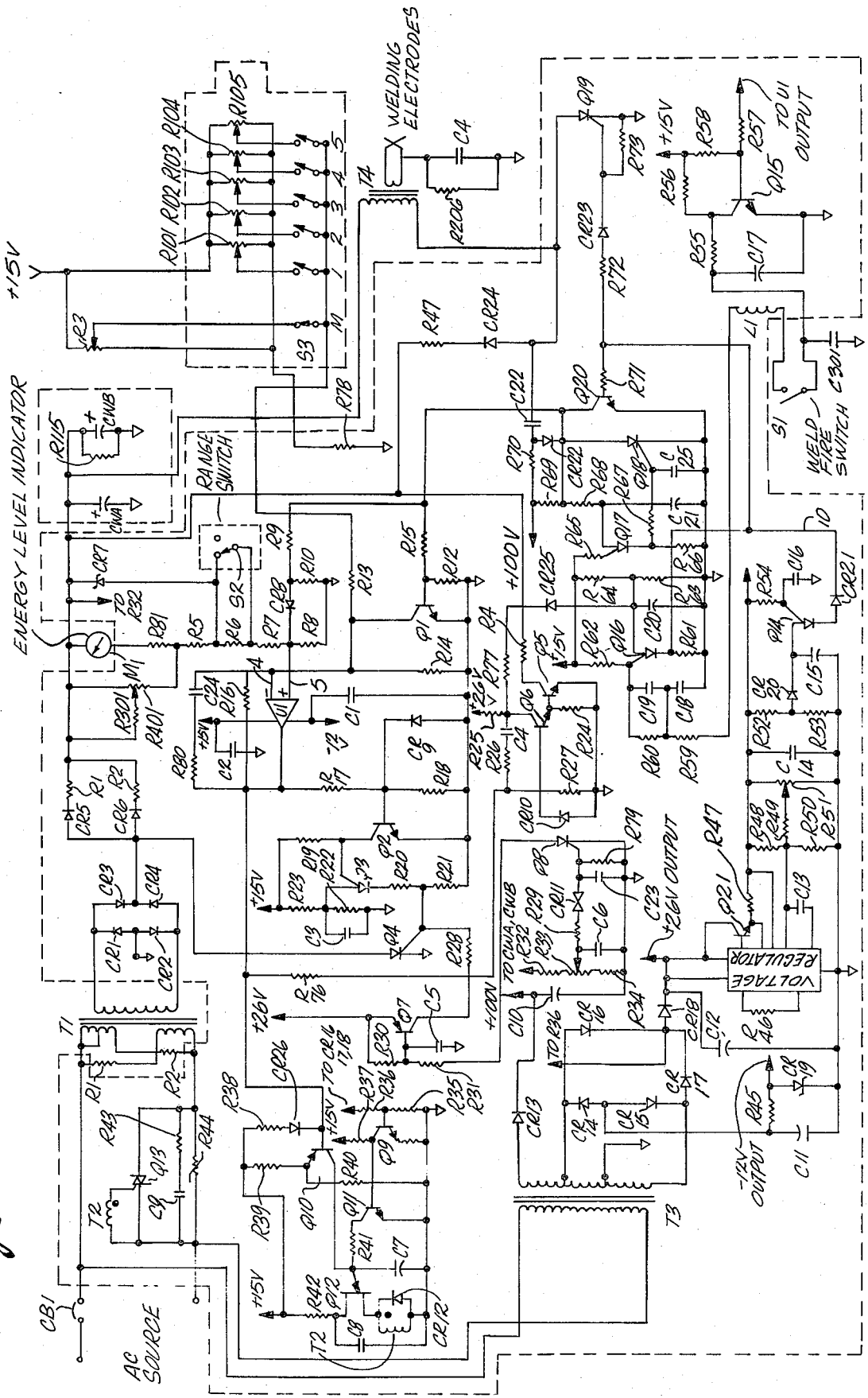
FIG. 2 is a schematic diagram of the welding power supply.

Referring to FIG. 2, there is shown in detail, the circuit diagram of the presently preferred embodiment of the herein described invention. Power supply transformer T1 receives power from A.C. line supply and has two independent primary windings and one secondary winding. The primary windings are connected in parallel combination when the A.C. line supply is at standard 100 to 130 rated voltages while the primary windings are connected in series when the A.C. supply has a rated voltage of between 200 volts and 260 volts. Resistor R1 and R2 that are in series with their corresponding primary windings serve as primary winding current limiters. Thyristor Q13, which in the preferred embodiment is a triac, is connected between the A.C. line supply and the primary winding of the rectifying power supply transformer T1. Triac Q13 serves as a series switch to alternately connect and interrupt power delivery to the power supply transformer as a function of gate voltage supplied by transformer T2 connected to the gate terminal of triac Q13. Capacitor C9 and resistor R43 form a filter network and in conjunction with metal oxide varistor R44, serve to absorb any transient voltages that exist on the A.C. line either as a result of switching functions or as a result of power line interruptions. The secondary winding of the power supply transformer T1 is connected to diodes CR1, CR2, CR3 and CR4 that form a full wave rectifier bridge. The full wave rectifier output is passed through isolation diodes CR5 and CR6 to energy storage capacitors CWA and CWB. The energy storing capacitors are connected between one side of the primary windings of welding pulse transformer T4, and ground. To the other side of the primary winding, there is connected output SCR Q19. To the secondary winding of the welding pulse transformer, there is attached two welding electrodes, for transfer of energy generated in the pulse transformer to the item to be welded.

In normal operation, the output SCR Q19 is deenergized while the energy storing capacitors are charged to a pre-selected level. When the desired energy level is reached in the storage capacitor, a weld fire control signal can be initiated either manually (or automatically, if the welder is coupled to an automatic welding system) by operating weld fire switch S1 which renders the output SCR Q19 conductive, thereby discharging the energy storage capacitors through the primary of the welding pulse transformer. The energy discharged through the welding transformer primary is coupled to the secondary winding terminals and thus transferred to the welding electrodes.

The feedback control loop that precisely regulates the amount of energy stored in the storage capacitor, includes difference amplifier U1. Amplifier U1 is a standard high gain input difference amplifier having an inverting input terminal 4 and a non-inverting terminal 5. Coupled to the inverting terminal 4 of the difference amplifier is the energy select circuit 17 consisting of a reference voltage (+15 v), a continuously variable potentiometer R3, and a plurality of switch selectable potentiometers R101 to R105. The continuously variable potentiometer permits selection of energy levels through a wide range of energy values while the switchable potentiometer assembly permits instantaneous selection of calibrated energy levels of known value.

The energy storage capacitor voltage is coupled to the non-inverting difference amplifier input 5 by means of capacitor energy indicating meter M1 and series input resistors R81, R5, R6 and R7. A range switch S2 is provided which shunts input resistor R6. Shunting of input resistor R6 lowers the overall input resistance to the difference amplifier thereby changing the level of operation of the welding supply to a lower range. R301 and R401 serve as calibration resistors for M1 while zener diode CR7 serves as a meter overvoltage protection device. Feedback resistor R16 connected between the inverting and the output terminal of the difference amplifier serves to establish a linear gain of the amplifier while feedback combination of resistor R80 and capacitor C24 serve to stabilize the overall feedback loop to prevent welder supply oscillation.

Coupled to the output of the difference amplifier is power supply controller 14 that serves as a trigger pulse generator and includes a current generator transistor Q10, line synchronization transistors Q9 and Q11, and a unijunction transistor Q12. The base electrode of the current source transistor Q10 is connected to the output of the difference amplifier and controls the amount of current generated by the current source Q10. To the emitter of the unijunction transistor is connected charging capacitor C7 and to one base of the unijunction transistor is connected the primary winding of transformer T2. The secondary winding of transformer T2 is connected to the gate electrode of the series triac Q13. During energy storage device charging from an initially deenergized condition the output of the difference amplifier is saturated with an output voltage approximately equal to the negative supply voltage. Such a negative voltage from the difference amplifier thereby commands a high current output from the current source Q10. The rate of increase of the voltage across emitter capacitor C7 is consequently fast, such that the unijunction transistor fires within a few electrical degrees of the beginning of the A.C. line supply half cycle. Since the voltage across triac Q13 is an A.C. signal, the current through it becomes zero once every half cycle of the A.C. supply and therefore in the absence of a gate signal triac Q13 opens and remains open until a subsequent gating signal is applied.

The pulse generated in the primary of T2 due to the conduction of unijunction transistor Q12 is transferred to the gate of triac Q13 by means of the secondary winding of transformer T2. The condition of triac Q13 permits energy transfer from the A.C. supply through the power supply transformer thereby causing the energy storage capacitors to commence charging. As the voltage across the storage capacitor rises, the output of the difference amplifier becomes less negative, thereby decreasing the current generated by the current source transistor Q10. With such a decrease in the current source output, the time at which the unijunction Q12 fires is delayed, thereby increasing the firing angle of the series triac and thus proportionately reducing the amount of energy transfer through the power supply transformer T1 per half cycle of the A.C. line supply.

Upon coincidence of the storage capacitor energy and the pre-selected level, current source transistor Q10 is turned off thus inhibiting subsequent series triac Q13 gating pulses. Any capacitor charge loss, however, due to leakage, causes Q10 to conduct proportionately to the amount of lost charge resulting in an increase in series triac Q13 conduction angle thus phasing forward the triac Q13 to replenish any lost capacitor charge (see FIG. 4).

Also connected to unijunction transistor Q12 is a synchronization circuit consisting of Q9 and Q11. The base of Q9 is driven by the full wave rectifier output of power output transformer T3, such that transistor Q11 which acts as a current sink is momentarily turned on at every zero crossing of the A.C. supply. Sink transistor Q11 provides a shorting path through resistor R41 to completely discharge capacitor C7 and divert the charging current from transistor Q10 to ground. The charging time of C7 is therefore depending solely on the magnitude of the current source Q10 output and not on any residual capacitor charge. The charging of C7 is initiated immediately after the zero crossing of the A.C. supply thus synchronizing the charging cycle substantially coincident with the A.C. signal supplied to the rectifying power supply. The triac firing angle is consequently dependent only on, and proportional to the output of the difference amplifier.

Shunt switch 16 is connected between the output of the difference amplifier 18 and the output of the rectifying power supply 10 includes drive transistor Q2, programmable unijunction transistor Q3 and silicon controlled rectifier Q4. The base of the drive transistor Q2 is connected through a voltage divider network consisting of R18 and R17 to the output of the difference amplifier. To the collector electrode of Q2 is connected the gate of the programmable unijunction transistor Q3 while its anode is connected to a trigger capacitor, charged to a fixed fraction 15 volt power source by means of voltage dividers R22 and R23. The cathode of Q3 is connected to the gate of the shunting SCR Q4 through series resistor R20.

The input resistor biasing R5, R6, R7 of difference amplifier U1 is adjusted such that when there is coincidence between the energy level in the storage capacitor and the pre-selected value, the voltage output of the amplifier will be in the range of about −3 volts. Any leakage in the energy storage capacitor bank causes a decrease in difference amplifier output voltage such that the series triac Q13 is pulsed with sufficient firing angle to supply any lost capacitor charge. Any amount of charge in the storage capacitor above the pre-selected level causes the difference amplifier output to rise sufficiently to forward bias drive transistor Q2 into conduction. At conduction, the gate electrode of the programmable unijunction transistor Q3 is shunted to ground, thus lowering the potential difference between the anode and the gate of Q3 such that Q3 turns on. At such a time, the potential difference across R21 rises thereby applying a gating signal sufficient to turn on the SCR Q4. Q4 shunts the output of the power supply transformer, to ground, thus preventing any additional charge accumulation in the energy storage capacitors (see FIG. 4).

As a result, precise control over the amount of charge delivered to the energy storage capacitors is achieved by means of the difference amplifier and the shunt SCR Q4 that is turned on as a function of difference amplifier output voltage. At the next zero crossing of the output of the full wave rectifier, the current through the shunt SCR Q4 is zero so that it and triac Q13 turns off, i.e. commutates and will remain off until a gating signal sufficient to initiate conduction is generated by the difference amplifier.

Also connected to the output of the error amplifier is turndown circuit 25 that includes transistor Q6 and Q5, in a Darlington configuration, connected to the energy storage capacitors by means of resistor R4. The turndown circuit serves to discharge the energy storage capacitors when the pre-selected energy level is lower than the level existing in the storage capacitors. The biasing resistors R27 and R76 are selected such that the turndown circuitry is rendered conductive when the output voltage of the difference amplifier exceeds that required to fire the shunt SCR Q4. The turndown circuit will remain conductive until the output energy storage capacitors are discharged to within one (1) percent of the pre-selected value.

A weld fire control signal is generated in the weld fire controller 26 that includes weld fire lockout transistor Q15, weld fire switch S1, and a programmable unijunction transistor Q16.

The base electrode of Q15 is connected through resistor R57 to the output of the difference amplifier U1. To the collector electrode of Q15 is connected through series resistor R55, one side of the weld fire switch S1. The other side of the weld fire switch S1 is connected, through series inductor L1 and the filter circuit consisting of R59, R60, C19 and C18, to the gate electrode of the programmable unijunction transistor Q16. Inductor L1 and capacitors C3, C18 and C19, connected to the weld fire switch S1, prevent premature weld firing due to radio frequency interference and enhance firing in the presence of firing switch contact bounce. The anode of Q16 is connected to a trigger capacitor C20 charged to a fixed fraction of the 15 volt D.C. power source through voltage divider resistors R63 and R64. The cathode of Q16 is connected to the gate electrode of output SCR Q19 through R72, CR23. During energy storage capacitor charge up, the output of the difference amplifier is sufficiently negative to reverse bias Q15 to be non-conductive, therefore rendering weld fire switch S1 ineffective. At such time that the energy storage capacitors are in a pre-selected charge condition, the difference amplifier output is such that Q15 is conductive thereby connecting one side of the weld fire switch to ground.

Closure of the weld fire switch S1 rapidly discharges capacitor C18 through resistor R59 into capacitor C17. The rapid decrease in voltage across capacitor C18 is coupled through capacitor C19 to the gate of transistor Q16, rendering it conductive. The voltage appearing at the cathode of Q16 during conduction is applied as a gating signal through series resistor R72 and diode CR23 to the gate of the output SCR Q19, thus initiating the welding cycle.

Also connected to the output SCR Q19 gating signal is commutation circuit 27 which acts as a one shot multi-vibrator of pulse duration in the range of about 0.01 seconds to turn off the output SCR Q19 after discharge of the storage capacitor.

Commutation circuit 27 includes capacitor C22 connected between and anode of SCR Q19 and the anode of diode CR22. To the anode of diode CR 22 is connected a D.C. supply in the order of 100 volts through resistor R70. To the cathode of diode CR22 is connected the collector of transistor Q20, the anode of SCR Q18, and the junction point of series resistors R68 and R69. To the supply end of R69 is connected a D.C. source in the order of about 100 volts and to the load side of R68 is connected the anode of programmable unijunction transistor Q17 and timing capacitor C21. The cathode of Q17 is connected to ground through series resistor R66 and to the gate of SCR Q18 through resistor R67. The gate of Q17 is connected to a 15 volt D.C. source through series limiting resistor R65.

Prior to the weld fire command, SCR Q18 is conductive so that its anode potential is near zero volts and the programmable unijunction Q17 is non-conductive since its anode potential is less positive than its gate potential. Because diode CR22 is forward biased, its anode potential is approximately at ground potential. Thus, the terminal of capacitor C22 connected to the anode of CR22 is similarly at ground potential while the other electrode of capacitor C22, connected to the anode of output SCR Q19, is at the pre-selected voltage of the weld capacitor, which ranges from 10 volts to about 400 volts. Responsive to the weld fire command pulse, Q19 and Q20 are rendered conductive, thereby diverting anode current from Q18 to ground, thus shutting off Q18. The voltage at the anode of Q19 approaches ground potential so that the capacitor C22 electrode connected to the anode of CR22 goes negative to voltages as low as −400 volts and begins to charge towards 100 volts through resistor R70. Upon termination of a short weld fires pulse from Q16, Q20 is turned off and the anode of Q17 begins to charge through the charging circuit comprising R69, R68 and capacitor C21. When the anode potential of Q17 is about ½ volt above its gate potential, Q17 is rendered conductive, thereby generating a voltage across R66 which is transferred to the gate of SCR Q18, thereby initiating its conduction. During conduction of Q18, the anode potential of CR22 is driven to ground resulting in a transfer of a negative pulse of about −100 volts to the anode of the output SCR Q19, thereby turning it off. Thus commutation of SCR Q19 is achieved.

Due to the weld fire lockout circuit discussed previously, the output SCR Q19 is disabled and thus prevented from conduction until the energy storage capacitor bank is recharged to the pre-selected value.

The anode of SCR Q18 is connected to the base of charge disabling transistor Q1 in charge lockout circuit 22 through base voltage divider resistors R15 and R12, such that, during the commutation interval, i.e., the charging of capacitor C21 sufficient to fire Q16, the output of the difference amplifier is maintained positive rendering shunt SCR Q4 conductive but causing a zero conduction angle in the series triac Q13.

Over voltage protection circuit 28 includes a potentiometer consisting of series connected resistors R32, R33 and R34 defining a potentiometer. The potentiometer is connected between the energy storage capacitors CWA, CWB and ground, while the arm of the potentiometer is connected to the gate of a SCR Q8 through series resistor R29 and diac CR11. To the anode of SCR Q8 is connected the base of drive transistor Q7 through series resistor R31. To the base of Q7 is also connected a 26 volt D.C. supply through series resistor R30. The emitter of Q7 is also connected to the 26 volt supply while the collector of Q7 is connected to the gate electrode of the shunt SCR Q4. The potentiometer and the diac values are set such that the voltage across diac CR11 is sufficient to cause firing of Q8 when the energy storage capacitor voltage is in the range of about 435 volts. Upon conduction of Q8, the voltage at the base of Q7 drops below the emitter voltage such that Q7 becomes conductive, thereby applying a positive potential at the gate of Q4 rendering it conductive. Any over voltage, therefore, that is detected at the output of the energy storage capacitors causes the SCR Q4 to shunt the output of rectifying power supply to ground, thereby preventing the energy storage capacitor voltage from exceeding about 435 volts. Additional protection against overcharge is provided by means of circuit breaker CB1 which is responsive to current excesses in the primary of T1 when SCR Q4 is rendered conductive for long periods.

Line failure turndown circuit 30 includes a standard full wave rectifying power supply with a plurality of conventional output voltage regulators of various output levels. To the output of one of the regulated supply voltages is connected programmable unijunction transistor Q14 through series resistor R54 and R47. Connected between the gate of Q14 and ground is discharge capacitor C16, and connected across the regulated supply are series resistors R52 and R53. The anode of Q14 is connected to the junction point between R42 and R53 through diode CR20. Also connected between the anode of Q4 and ground is capacitor C15. The cathode of Q14 is connected to the weld fire command signal line 10 through series diode CR21. During normal operation, the gate electrode of Q14 is at about the supply voltage while the anode is about ⅔ of the supply voltage. If a line failure occurs, capacitor C16 discharges towards ground potential. At such time that the gate potential of Q14 is within ½ volt of its anode voltage Q14 will become conductive thereby transferring the potential existing across C15 to the gate of the output SCR 19 rendering it conductive, and thereby completely discharging the energy storage capacitors.

Figure 3:
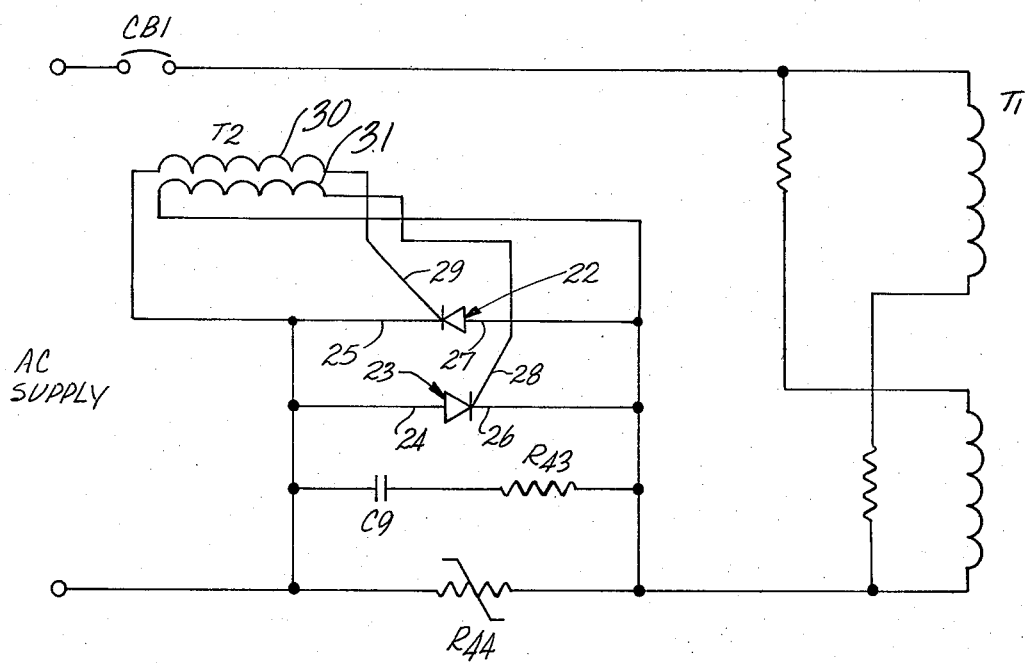
FIG. 3 is a schematic diagram of the rectifying power supply utilizing two back-to-back silicon controlled rectifiers as a series switch.

An alternate embodiment of the circuitry of the series thyristor is shown in FIG. 3. As shown therein, the thyristor is a pair of silicon-controlled rectifiers 22,23 connected in a back-to-back relationship. The anode 24 of SCR 23 is connected to the cathode 25 of SCR 22 and to one side of secondary 30 of transformer T2. The cathode 26 of SCR 23 is likewise connected to the anode 27 of SCR 22 and to one side of another secondary winding 21 of transformer T2. The gate electrodes 28 of SCR 23 is connected to the opposite side of winding 31, while gate electrode 29 of SCR 22 is connected to the opposite side of winding 30. The combination of back-to-back SCR's is connected to the remainder of the circuit in the same manner as triac Q13.

While the basic principle of this invention has been herein illustrated along with one embodiment it will be appreciated by those skilled in the art that variations in the disclosed arrangement both as to its details and as to the organization of such details may be made without department from the spirit and scope thereof. Accordingly, it is intended that the foregoing disclosure and the showings made in the drawings will be considered only as illustrative of the principles of the invention and not construed in a limiting sense.

What is claimed is:

1. A highly regulated welding energy power supply comprising:
    a welding energy storage capacitor;
    a first circuit means connected in series circuit relationship with the storage capacitor for initiating charging of the storage capacitor to a pre-selected energy level;
    switching means in series circuit arrangement with the first circuit means, the conduction angle of the switching means being phased forward as a function of the difference between the storage capacitor energy level and the pre-selected level; and
    second circuit means connected in shunt circuit relationship with the first circuit means for terminating charging of the storage capacitor when the pre-selected level is reached thereby preventing overcharge of the capacitor.

2. A highly regulated capacitive discharge resistance welder comprising:
    an alternating current source of charging electrical energy;
    energy storage capacitive means;
    error detector means for comparing the energy level of the energy storage means to a pre-selected level;
    first circuit means for supplying charging electrical energy to the capacitive means such that energy supply is a function of the difference between the energy level of the capacitive means and the pre-selected level;
    second circuit means responsive to the error detector means for shunting the charging electrical energy away from the capacitive means only during a portion of the cycle of the alternating current source signal when the energy level of the capacitive means reaches the pre-selected level, whereby storage of the energy above the pre-selected level is prevented, and whereby during any charging of the capacitor means no further current passes through the second circuit means beyond that provided in the remainder of the cycle of the alternating current source signal when the pre-selected level is reached;
    third circuit means responsive to the error detector means for initiating the supply of charging electrical energy by the first circuit means, and phasing forward the conduction angle of the charging electrical energy, when the energy level of the capacitive means drops below the pre-selected level, such that the source of charging electrical energy resupplies that amount of charge energy lost by the capacitive means due to leakage; and
    means for delivering the energy stored in the capacitive means to a pair of welding electrodes.

3. A welder according to claim 2 wherein the first circuit means includes a thyristor connected in series circuit relationship with the capacitor means.

4. A welder according to claim 3 wherein the series thyristor is a pair of silicon controlled rectifiers connected in parallel, the first silicon controlled rectifier having an anode and a cathode connected to a cathode and an anode respectively of the second silicon controlled rectifier.

5. A welder according to claim 4 wherein the first circuit means further includes means for rectifying the alternating current signal to the capacitive means.

6. A welder according to claim 5 including a transformer having a primary winding and a secondary winding, the primary winding being connected to the alternating current source; and wherein
the means for rectifying the alternating current source signal is a full wave rectifier bridge connected to the secondary winding the transformer.

7. A welder according to claim 6 including a triac having anode, cathode and gate electrodes, the anode and cathode electrodes of the triac being connected in series with the primary winding of the transformer, the gate electrode of said triac being connected to the third circuit means such that the firing angle of the triac is controlled by the third circuit means as a function of the difference between capacitive means energy level and the pre-selected level.

8. A welder according to claim 7 wherein the third circuit means further comprises:
means to generate triac gate pulses to initiate conduction of said triac;
synchronization means to synchronize the gate pulse generator means with the alternating current energy signal; and
means to vary the time at which the gate pulse generator means conducts thereby controlling the firing angle of said triac in accordance with the difference between the capacitive means energy level and the pre-selected level.

9. A welder according to claim 2 wherein the second circuit means is connected in shunt circuit relationship with the first circuit means.

10. A welder according to claim 9 wherein the second circuit means includes a thyristor connected in parallel circuit relationship with the first circuit means, said thyristor responsive to the error detecting means such that the thyristor is gated on when the capacitive means energy level reaches the pre-selected level, said thyristor diverting the supply of energy away from the capacitive means.

11. A welder according to claim 10 wherein the thyristor is a triac.

12. A welder according to claim 10 wherein the thyristor is a silicon controlled rectifier.

13. A welder according to claim 2 wherein the means to deliver the stored energy to a pair of welding electrodes further comprises:
a weld transformer having a primary winding coupled to the storage capacitive means and a secondary winding connected to the pair of welding electrodes; and
a thyristor coupled to the primary winding of the transformer, said thyristor having a first state in which the capacitive means discharges through the primary winding and a second state in which said thyristor blocks discharge of said capacitive means through the primary winding.

14. A welder according to claim 13 wherein the thyristor is a silicon controlled rectifier.

* * * * *

UNITED STATES PATENT AND TRADEMARK OFFICE
CERTIFICATE OF CORRECTION

PATENT NO. : 4,228,340
DATED : October 14, 1980
INVENTOR(S) : Gerald Dufrenne

It is certified that error appears in the above—identified patent and that said Letters Patent is hereby corrected as shown below:

```
Column 4, Line 34, change "Resistor" to -- Resistors --.
Column 6, Line 40, delete "is" after "16".
Column 8, Line 5, "0.01" should read -- 0.1 --;
Line 9, "and" first occurrence, should read -- the --.
Column 11, Claim 6, Line 10, insert -- of -- after
"winding".
```

Signed and Sealed this

Seventeenth Day of March 1981

[SEAL]

Attest:

RENE D. TEGTMEYER

Attesting Officer

Acting Commissioner of Patents and Trademarks